US011244025B2

(12) United States Patent
Avihail et al.

(10) Patent No.: US 11,244,025 B2
(45) Date of Patent: Feb. 8, 2022

(54) SYSTEMS AND METHODS FOR UPDATING DATA PIPELINES

(71) Applicant: Facebook, Inc., Menlo Park, CA (US)

(72) Inventors: Eitan Mordechai Avihail, Giv'at Shmuel (IL); Amir Gershman, Omer (IL); Ahmad Eessa, Nahef (IL)

(73) Assignee: Facebook, Inc., Menlo Park, CA (US)

( * ) Notice: Subject to any disclaimer, the term of this patent is extended or adjusted under 35 U.S.C. 154(b) by 912 days.

(21) Appl. No.: 15/702,573

(22) Filed: Sep. 12, 2017

(65) Prior Publication Data

US 2019/0080016 A1    Mar. 14, 2019

(51) Int. Cl.
| | |
|---|---|
| *G06F 16/958* | (2019.01) |
| *H04L 29/08* | (2006.01) |
| *H04L 29/06* | (2006.01) |
| *H04L 12/24* | (2006.01) |
| *G06F 16/25* | (2019.01) |

(52) U.S. Cl.
CPC .......... *G06F 16/972* (2019.01); *G06F 16/254* (2019.01); *H04L 41/0253* (2013.01); *H04L 67/16* (2013.01); *H04L 69/16* (2013.01)

(58) Field of Classification Search
None
See application file for complete search history.

(56) References Cited

U.S. PATENT DOCUMENTS

| | | | | |
|---|---|---|---|---|
| 2013/0227573 A1* | 8/2013 | Morsi | ................... | G06F 9/5083 |
| | | | | 718/100 |
| 2014/0279838 A1* | 9/2014 | Tsirogiannis | ......... | G06F 16/235 |
| | | | | 707/603 |
| 2016/0110435 A1* | 4/2016 | Martens | ................ | H04L 61/103 |
| | | | | 707/602 |
| 2016/0358101 A1* | 12/2016 | Bowers | ................... | G06F 9/453 |

* cited by examiner

*Primary Examiner* — Amresh Singh
(74) *Attorney, Agent, or Firm* — FisherBroyles, LLP

(57) ABSTRACT

A computer-implemented method for updating data pipelines may include (i) identifying at least one file that defines a series of transformations for data that passes through a data pipeline, for an application, that reads from at least one input table and writes to at least one output table, (ii) designating as a development version of the data pipeline at least one additional file that comprises a modified version of the file (iii) creating an additional version of the output table, (iv) detecting an execution of the additional file, and (v) directing output data written by the file to the additional version of the output table instead of the output table in response to both detecting the execution of the additional file and determining that the additional file is designated as the development version. Various other methods, systems, and computer-readable media are also disclosed.

20 Claims, 5 Drawing Sheets

SYSTEMS AND METHODS FOR UPDATING DATA PIPELINES

BACKGROUND

Administrators of large web sites, services, and other applications frequently need to perform the same series of steps on large quantities of data. For example, an administrator who wishes to analyze traffic data from their website might extract a subset of data from log files, store that data in a database that can manipulate and sort the data, and export a view of the data from the database to a dashboard. One solution for performing these repetitive tasks on a frequent basis is to construct a data pipeline, which may include a combination of tools, scripts, and other elements that initiate the desired series of transformations on the data when triggered manually or at specified intervals. However, changes to any element of a data pipeline can produce changes in the output even when the actual data has not changed, especially if an attempt to change the data pipeline introduces bugs to an element of the data pipeline.

Unfortunately, traditional systems for updating data pipelines may not account for apparent data inconsistencies due to pipeline updates. Many systems for updating data pipelines may only allow a user to make changes to the live, production version of the data pipeline, preventing the user from being able to test and debug changes before affecting production data. Some traditional systems may take minutes, hours, or even days to slowly update production output tables after updating data processing logic in a data pipeline. The instant disclosure,therefore, identifies and addresses a need for systems and methods for updating data pipelines.

SUMMARY

As will be described in greater detail below, the instant disclosure describes various systems and methods for updating data pipelines by facilitating the creation of development branches of data pipelines with accompanying development versions of the relevant tables that can be read from and/or written to without interfering with production data.

In one example, a method for performing such a task may include (i) identifying at least one file that defines a series of transformations for data that passes through a production version of a data pipeline for an application, where the data pipeline reads input data from at least one input table and writes output data to at least one output table, (ii) designating as a development version of the data pipeline at least one additional file that includes a modified version of the file, (iii) creating an additional version of the output table, (iv) detecting an execution of the additional file that is designated as the development version of the data pipeline, and (v) directing output data written by the file to the additional version of the output table instead of the output table in response to both detecting the execution of the additional file and determining that the additional file is designated as the development version of the data pipeline.

In one embodiment, designating the additional file as a development version of the data pipeline may include detecting the additional file in a directory designated as a development directory. In this embodiment, determining that the additional file is designated as the development version of the data pipeline may include determining that the additional file is stored in the development directory. In some examples, determining that the additional file is stored in the development directory may include parsing the name of the development directory with a regular expression.

In one embodiment, the method may further include creating an additional version of the input table at least in part by copying data from the input table and directing the file to read input data from the additional version of the input table instead of the input table in response to both detecting the execution of the additional file and determining that the additional file is designated as the development version of the data pipeline. In one embodiment, the method may further include determining that the additional version of the input table is no longer up to date and updating the additional version of the input table by copying up-to-date data from the input table.

In one embodiment, the output table may be accessible to end users of the application and the additional version of the output table may not be accessible to end users of the application. In some examples, the method may further include creating a list of tables not to copy and creating the additional version of the input table may include identifying a set of tables relevant to the application and, for each table within the set of tables that is not in the list of tables not to copy, creating an additional version of the table In some examples, the method may further include replacing data within the output table with the output data written by the development version of the data pipeline to the additional version of the output table. In some examples, the method may further include modifying the file by copying content from the additional file to the file. In one embodiment, the method may further include creating, at regular intervals, at least one new file that may include a new modified version of the file and that is designated as the development version of the data pipeline.

In one embodiment, a system for implementing the above-described method may include (i) an identification module, stored in memory, that identifies at least one file that defines a series of transformations for data that passes through a production version of a data pipeline for an application, where the data pipeline reads input data from at least one input table and writes output data to at least one output table, (ii) a designation module, stored in memory, that designates as a development version of the data pipeline at least one additional file that includes a modified version of the file, (iii) a creation module, stored in memory, that creates an additional version of the output table, (iv) a detection module, stored in memory, that detects an execution of the additional file that is designated as the development version of the data pipeline, (v) a direction module, stored in memory, that directs output data written by the file to the additional version of the output table instead of the output table in response to both detecting the execution of the additional file and determining that the additional file is designated as the development version of the data pipeline, and (vi) at least one physical processor configured to execute the identification module, the designation module, the creation module, the detection module, and the direction module.

In some examples, the above-described method may be encoded as computer-readable instructions on a computer-readable medium. For example, a computer-readable medium may include one or more computer-executable instructions that, when executed by at least one processor of a computing device, may cause the computing device to (i) identify at least one file that defines a series of transformations for data that passes through a production version of a data pipeline for an application, where the data pipeline reads input data from at least one input table and writes output data to at least one output table, (ii) designate as a development version of the data pipeline at least one additional file that includes a modified version of the file, (iii) create an additional version of the output table, (iv) detect an execution of the additional file that is designated as the development version of the data pipeline, and (v) direct output data written by the file to the additional version of the output table instead of the output table in response to both detecting the execution of the additional file and determining that the additional file is designated as the development version of the data pipeline.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
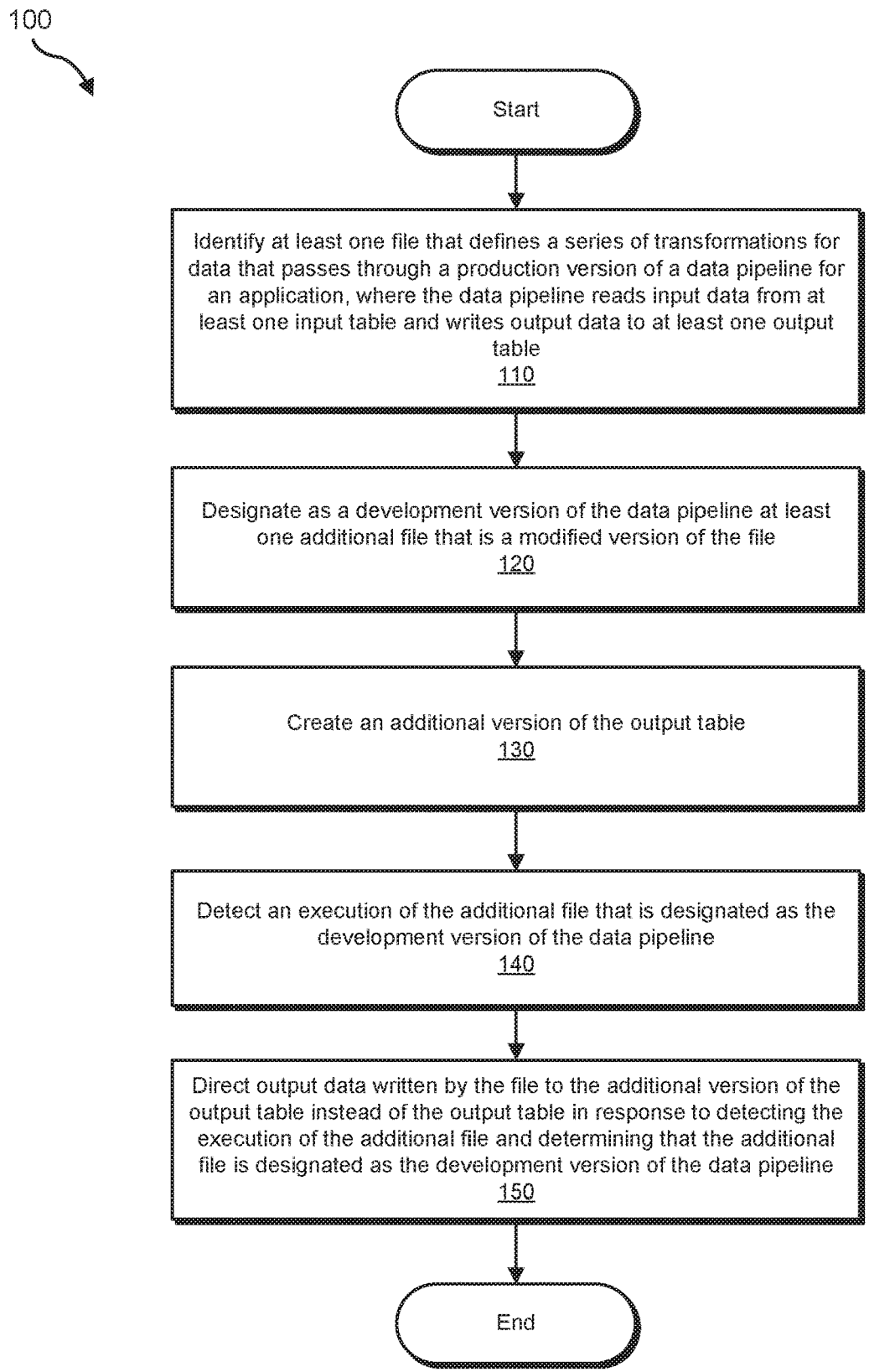
FIG. 1 is a flow diagram of an exemplary method for updating data pipelines.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for updating data pipelines. As will be explained in greater detail below, by creating a development version of a data pipeline and development versions of relevant tables, the systems and methods described herein may enable a developer to make and/or test changes to a data pipeline without interfering with production data. By creating a development version of a data pipeline, the systems and methods described herein may improve the development process for data pipelines, reducing the amount of bugs that make it into production data pipeline code and reducing disruptions caused by sudden changes in data processing logic and/or other aspects of a data pipeline. In addition, the systems and methods described herein may improve the functioning of a computing device by improving the functioning of data pipelines that execute on the computing device. These systems and methods may also improve the field of data processing by giving developers increased options for modifying, testing, and/or updating data pipelines that process data.

The following will provide with reference to FIG. 1, detailed descriptions of a method for updating data pipelines. Additionally, detailed descriptions of a system for updating data pipelines will be provided in connection with FIGS. 2 and 4. Detailed descriptions of exemplary data pipelines will also be provided in connection with FIG. 3. Finally, detailed descriptions of an exemplary method for updating production data while updating data pipelines will be provided in connection with FIG. 5.

FIG. 1 is a flow diagram of an example computer-implemented method 100 for updating data pipelines. The steps shown in FIG. 1 may be performed by any suitable computer-executable code and/or computing system, including system 200 in FIG. 2 and/or variations or combinations of one or more of the same. In one example, each of the steps shown in FIG. 1 may represent an algorithm whose structure includes and/or is represented by multiple sub-steps, examples of which will be provided in greater detail below.

As illustrated in FIG. 1, at step 110, one or more of the systems described herein may identify at least one file that defines a series of transformations for data that passes through a production version of a data pipeline, for an application, that reads input data from at least one input table and writes output data to at least one output table.

The term "file," as used herein, generally refers to any type of stored data object, including electronic files, portions of files, and/or database entries. In some embodiments, a file may be an executable file that, when executed, launches one or more processes. In other embodiments, a file may be a definition file that includes settings, configurations, definitions, and/or other instructions for one or more executable files. In some examples, the systems described herein may identify a group of files that includes a definition file and one or more executable files.

The term "series of transformations," as used herein, generally refers to one or more transformations to be performed on data in a specified order. The term "transformation," as used herein, generally refers to any action that involves modifying data, copying data, transferring data, combining data, extracting a portion of data, sorting data, aggregating data, and/or otherwise manipulating data. In one example, a transformation may include copying data from a log file to a database. In another example, a transformation may include copying a portion of data in one table into a different table. Additionally or alternatively, a transformation may include summarizing data from one or more tables into a summary for display in a report and/or dashboard.

The term "data pipeline," as used herein, generally refers to any collection of files, tools, and/or other components programmed to apply a series of transformations to data from one or more sources. In some examples, a data pipeline may aggregate data for analytic purposes. In other examples, a data pipeline may process data for use by end users. In some embodiments, a data pipeline may feed data to one or more downstream data pipelines and/or receive data from one or more upstream data pipelines.

The term "application," as used herein, generally refers to any software, service, and/or web site. In some embodiments, an application may operate on a single platform, such as a mobile application. In other embodiments, an application may operate on multiple platforms, such as an application with a web browser version and a mobile application version. In some embodiments, the systems described herein may process data from multiple applications.

The term "input table," as used herein, generally refers to any source of and/or storage location for data that is read from by a data pipeline. In some embodiments, an input table may be a table in a database. The term "output table," as used herein, generally refers to any storage location for data that is written to by a data pipeline. In some embodiments, an output table may be a table in a database. Additionally or alternatively, an output table may be a dashboard, a report, a flat file, and/or any other medium for data storage and/or display.

The term "production version," as used herein, generally refers to any version of an application, file, script, and/or data pipeline that reads from and/or writes to live data generated by and/or viewed by end users of an application who are not developers and/or testers of the application. For example, a production version of a social media network may enable end users to create profiles and connect to other profiles and a production version of the data pipeline for the social media network may record interactions by users of the production version of the social media network and aggregate those interactions for analysis.

The systems described herein may identify the file or files in a variety of ways and/or contexts. In some embodiments, the systems described herein may identify the file in response to the file being selected by a user. Additionally or alternatively, the systems described herein may identify all files in a designated directory as being part of a data pipeline.

At step 120, one or more of the systems described herein may designate as a development version of the data pipeline at least one additional file that includes a modified version of the file.

The term "development version," as used herein, generally refers to any version of an application, file, script, and/or data pipeline that does not output live data viewed by end users of an application who are not developers and/or testers of the application. For example, a development version of a social media network may enable developers to test changes to the social media network without disrupting the activity of end users and a development version of a data pipeline for the social media network may enable developers to test changes to data processing logic for the social media network without causing disruption to data received by end users and/or analysts.

The systems described herein may identify, detect, create, and/or designate the modified version of the file in a variety of ways. In some embodiments, the systems described herein may copy an identical version of the file for modification by a developer. In one embodiment, a developer may create the additional file by copying one or more files between directories. In some embodiments, the systems described herein may determine that the file is to be designated as a development version of the data pipeline by detecting that the file has been created in a directory designated as a development directory for the data pipeline.

At step 130, the systems described herein may create an additional version of the output table.

The systems described herein may create the additional version of the output table in a variety of ways and/or contexts. In some embodiments, the systems described herein may create the additional version of the output table by copying the output table. In other embodiments, the systems described herein may create an empty output table that has the same specifications (e.g., size, data type, column labels, and/or row labels) as the output table. In some examples, the systems described herein may create the additional version of the output table with a name based on the name of the original output table and a versioning scheme. For example, the systems described herein may create an additional version of a table named "profile_traffic_report" with the name "profile_traffic_report_v2."

In some embodiments, the systems described herein may create the additional output table in response to detecting that the additional file has been created and/or designated as a development version of the data pipeline. For example, the systems described herein may monitor one or more directories in order to detect when files are copied from and/or to those directories.

In some embodiments, the systems described herein may create additional versions of one or more input tables. In one embodiment, the systems described herein may create the additional version of the input table at least in part by copying data from the input table. For example, the systems described herein may create a copy of a user data table that is used as input by the data pipeline.

In some embodiments, the systems described herein may create a list of tables not to copy (i.e., a blacklist). In one embodiment, the systems described herein may create additional versions of one or more tables by identifying a set of tables relevant to the application and, for each table within the set of tables that is not in the list of tables not to copy, creating an additional version of the table. For example, the systems described herein may identify a list of tables read from and/or written to by the production version of the data pipeline and may create an additional version of each table that is not on the blacklist. In one example, an input table that is frequently updated in production may be on the blacklist in order to conserve the computing resources that would be required to frequently update the additional copy of the table. In some embodiments, the systems described herein may enable a developer to create and/or modify the blacklist. In some examples, the blacklist may only include input tables. In some examples, blacklisted tables may be tables that will not be adversely affected by extra traffic from the development version of the data pipeline.

In one embodiment, the output table may be accessible to end users of the application and the additional version of the output table may not be accessible to end users of the application. For example, the production version of the data pipeline may transform data created by end users into other data that is accessible to end users. Additionally or alternatively, the output table may be accessible to analysts who are not developers of the application and the additional version of the output table may not be accessible to analysts. For example, a data pipeline may aggregate web traffic data for a website and format the data into a report for analysts. In this example, changes made to the production version of the data pipeline may cause dips, troughs, or other irregularities in the data in the report even when the data itself has not changed. Testing changes in the development version of the data pipeline may prevent such irregularities from appearing in data visible to analysts.

At step 140, one or more of the systems described herein may detect an execution of the additional file that is designated as the development version of the data pipeline.

The systems described herein may detect an execution of the additional file in a variety of ways. In some embodiments, the systems described herein may monitor specified directories in order to detect the execution of files within those directories. In some embodiments, the systems described herein may monitor certain types of files. Additionally or alternatively, a developer may specify files to be monitored by the systems described herein.

In some embodiments, the systems described herein may create the additional versions of input and/or output tables in response to detecting the execution of the additional file. In one embodiment, a developer may copy files that make up a data pipeline from a production directory to a development directory. In this embodiment, the systems described herein may create additional versions of tables in response to detecting the execution of one or more files in the development directory.

At step 150, one or more of the systems described herein may direct output data written by the file to the additional version of the output table instead of the output table in response to both detecting the execution of the additional file and determining that the additional file is designated as the development version of the data pipeline.

The systems described herein may determine that the additional file is designated as the development version of the data pipeline in a variety of ways. In some embodiments, the additional file may be tagged, labelled, and/or otherwise categorized as a development version via metadata. Additionally or alternatively, the additional file may be hosted in a directory designated as a development directory. In some embodiments, the systems described herein may determine that the additional file is stored in the development directory by parsing the name of the development directory with a regular expression. In some examples, all directories designated as development directories may have a predetermined suffix in the directory name, such as "version [number]." In these examples, a regular expression may parse directory names for the presence of "version\d+.?\d*$" in order to determine whether a directory is a development directory.

The systems described herein may direct output data written by the additional file to the additional version of the output table in a variety of ways. In some embodiments, the systems described herein may supply an address and/or identifier of the additional output table as a parameter to the additional file in place of an address and/or identifier of the production version of the output table. In some embodiments, the systems described herein may dynamically rewrite the additional file to specify the additional version of the output table instead of the production version of the output table. Additionally or alternatively, the systems described herein may hook a function for writing to tables in order to redirect output from the additional file to the additional version of the output table instead of the production version of the output table.

Figure 2:
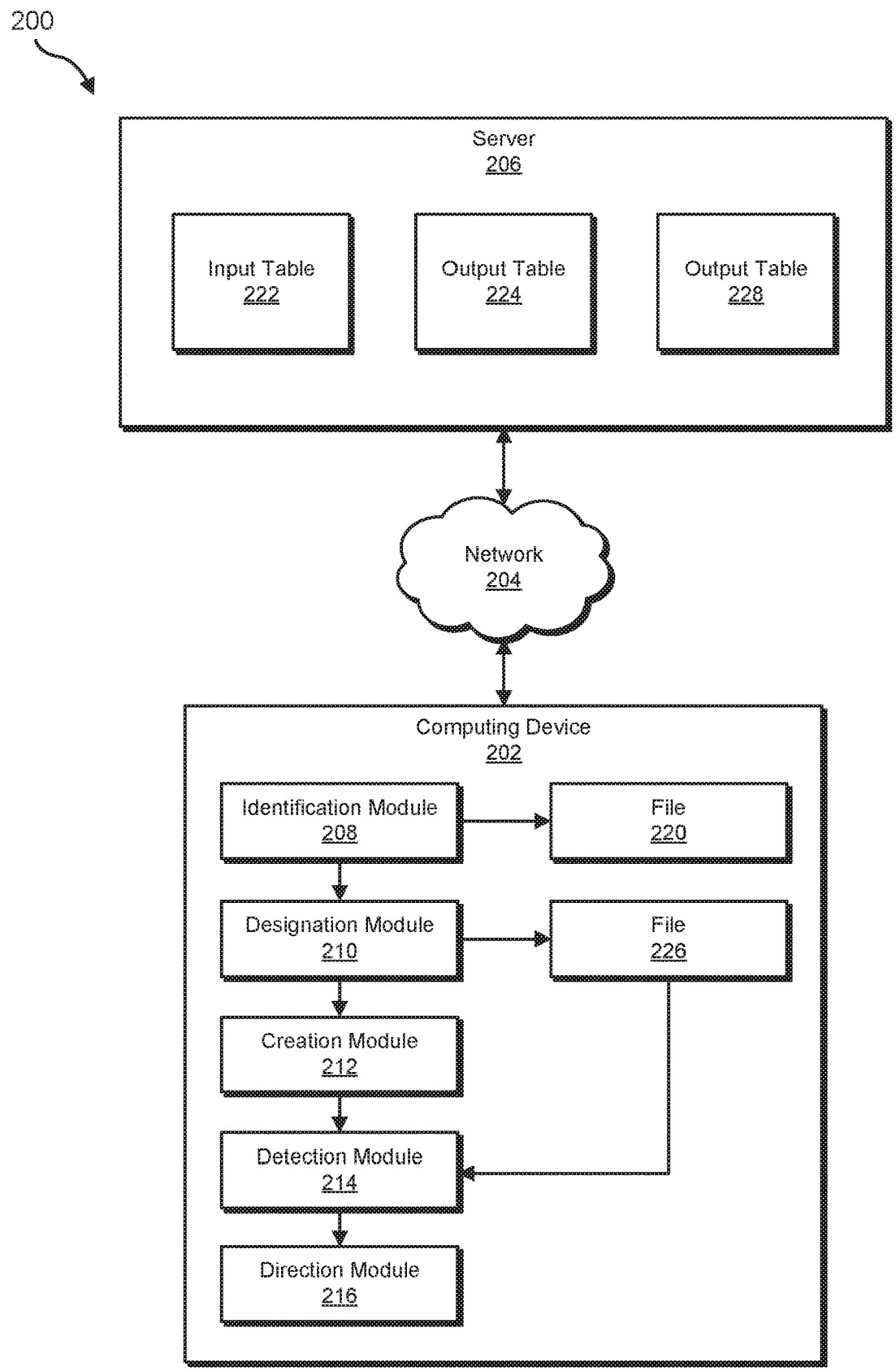
FIG. 2 is a block diagram of an exemplary system for updating data pipelines.

In some embodiments, the systems described herein may be implemented on one or more computing devices and/or servers communicating over a network. For example, as illustrated in FIG. 2, a system 200 may include a computing device 202 in communication with a server 206 via a network 204. In some embodiments, computing device 202 may be a personal computer, such as a laptop or a desktop. In other embodiments, computing device 202 may represent a server. In some embodiments, server 206 may be a single server that hosts all of the relevant tables for a data pipeline. In other embodiments, server 206 may represent multiple local and/or remote (i.e., cloud) servers. Network 204 may represent any type of network and/or combination of networks, including a local area network, a wireless network, and/or the Internet.

In some embodiments, an identification module 208 may identify at least one file 220 that defines a series of transformations for data that passes through a production version of a data pipeline, for an application, that reads input data from at least one input table 222 and writes output data to at least one output table 224. At some point in time, a designation module 210 may designate as a development version of the data pipeline at least one file 226 that includes a modified version of file 220. In some examples, a creation module 212 may create an output table 228. At some later point in time, detection module 214 may detect an execution of file 226 that is designated as the development version of the data pipeline. Next, direction module 216 may direct output data written by file 220 to output table 228 instead of output table 224 in response to both detecting the execution of file 226 and determining that file 226 that is designated as the development version of the data pipeline. Although illustrated on computing device 202 in FIG. 2, in some embodiments, various modules may be hosted on different computing devices.

In some embodiments, the systems described herein may direct the file to read input data from an additional version of an input table in addition to directing output written by the file to an additional version of an output able. In some examples, the systems described herein may use modified versions of production input tables in order to test potential changes. In other examples, the systems described herein may read from additional versions of input tables rather than production versions of input tables in order to ease the resource strain on production versions of input tables.

In some embodiments, the systems described herein may periodically update development versions of production input tables with up-to-date data from the production input tables. In some examples, the systems described herein may update development versions of production input tables every time a development version of the data pipeline is executed. In other examples, the systems described herein may update development versions of production input tables at predefined intervals, such as every day, week, or month. Additionally or alternatively, the systems described herein may update development versions of tables when manually triggered to do so by a developer.

Figure 3:
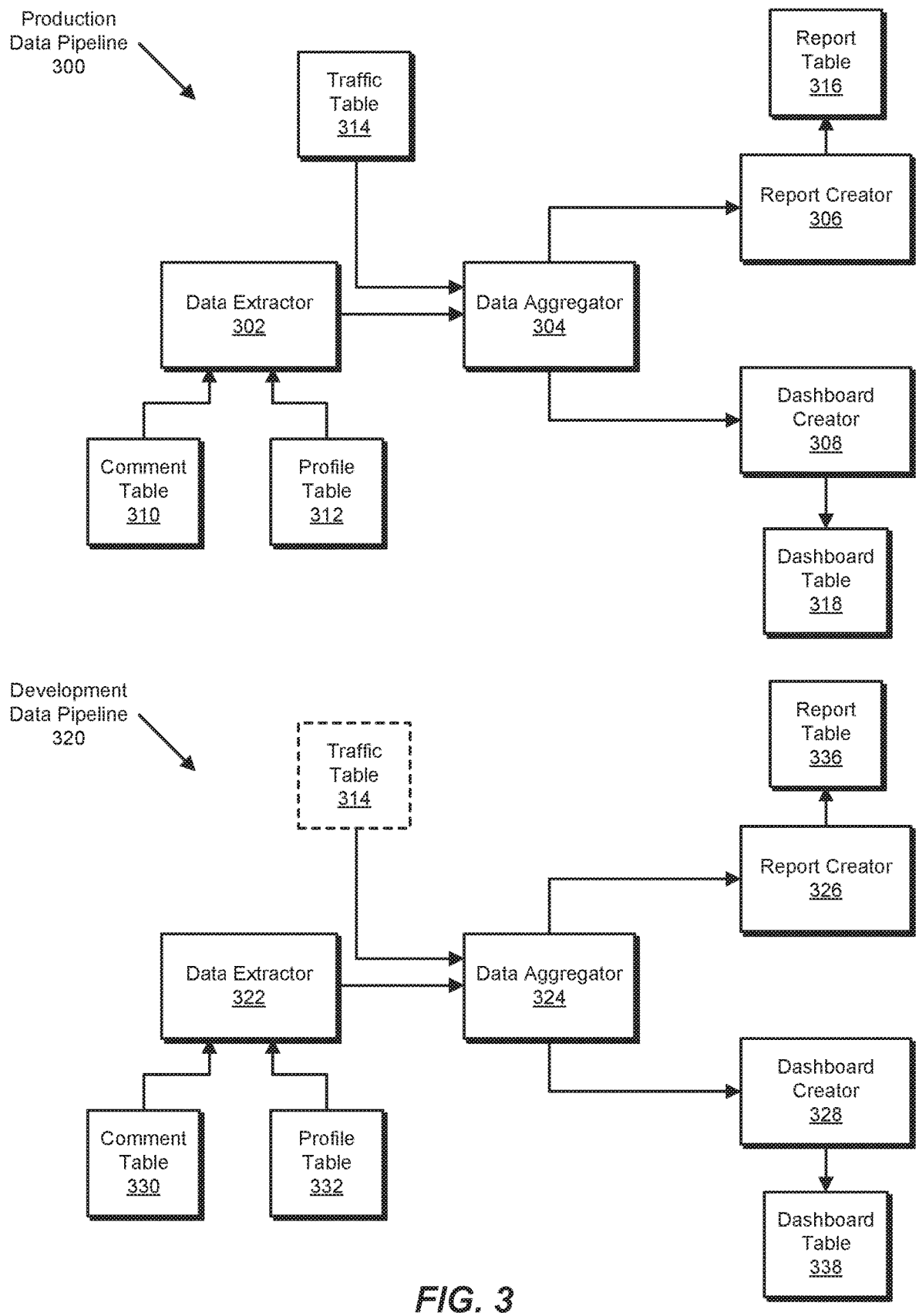
FIG. 3 is a block diagram of exemplary data pipelines.

In some embodiments, a data pipeline may read data from multiple input tables at multiple steps of the data pipeline and/or may write to various output tables. For example, as illustrated in FIG. 3, a production data pipeline 300 may include a data extractor 302 that extracts data from a comment table 310 and/or a profile table 312 and sends data to a data aggregator 304. In some embodiments, data aggregator 304 may also receive data from a traffic table 314 and/or may send aggregated data to a report creator 306 and/or a dashboard creator 308. In one embodiment, report creator 306 may write data to a report table 316 and/or dashboard creator 308 may write data to a dashboard table 318.

In some examples, the systems described herein may create a development data pipeline 320 at least in part by copying files from production data pipeline 300. For example, the systems described herein may create a data extractor 322, data aggregator 324, report creator 326, and/or dashboard creator 328 that may be modified versions of data extractor 302, data aggregator 304, report creator 306, and/or dashboard creator 308, respectively. In one example, data extractor 322 may extract data from a comment table 330 and/or a comment table 332 that may be modified versions of comment table 310 and/or profile table 312, respectively. In one example, data aggregator 324 may read data from traffic table 314 rather than from a copy of traffic table 314, for example because traffic table 314 is too large to efficiently copy, is the output of another data pipeline, and/or is updated frequently. In some examples, report creator 326 may write data to a report table 336 rather than the production table, report table 316. Similarly, dashboard creator 328 may write data to a dashboard table 338.

Figure 4:
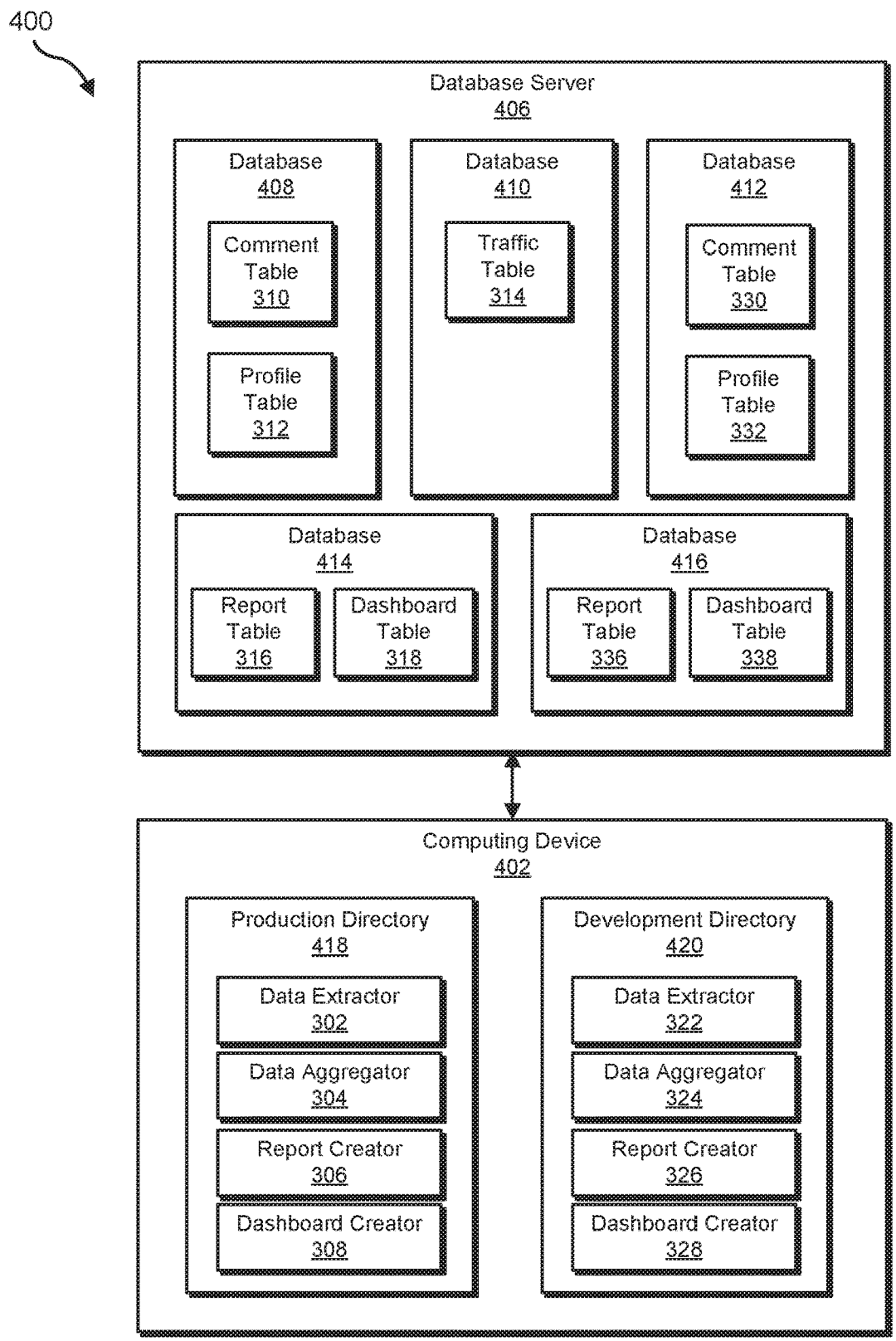
FIG. 4 is a block diagram of an exemplary system for updating data pipelines.

In some embodiments, the components of production data pipeline 300 and/or development data pipeline 320 may be stored on various computing devices and/or servers. For example, as illustrated in FIG. 4, a computing device 402 may communicate with a database server 406. Although illustrated as single elements, computing device 402 and/or database server 406 may each represent multiple computing devices and/or servers, such as a cluster of database servers in a data center. In some examples, comment table 310 and/or profile table 312 may be stored in a database 408 on database server 406. In some embodiments, the systems described herein may create comment table 330 and/or profile table 332 in a database 412. In other embodiments, the systems described herein may create the new tables in the same database as the original tables. In one example, traffic table 314 may be stored in a database 410. In some examples, report table 316 and/or dashboard table 318 may be stored in a database 414. In some embodiments, the systems described herein may create report table 336 and/or dashboard table 338 in a database 416. In other embodiments, the systems described herein may create the new output tables in the same database as the original output tables and/or in the same database as the new input tables.

In some embodiments, the files that make up production data pipeline 300 and/or development data pipeline 320 may be stored in different directories on a computing device. For example, data extractor 302, data aggregator 304, report creator 306, and/or dashboard creator 308 may be stored in a production directory 418 on computing device 402. In some embodiments, data extractor 322, data aggregator 324, report creator 326, and/or dashboard creator 328 may be stored in a development directory 420 on computing device 402. In one embodiment, the systems described herein may determine that any files stored in development directory 420 are part of a development version of a data pipeline. In some embodiments, the systems described herein may examine any files copied into development directory 420 for references to tables and may automatically create additional versions of those tables.

Figure 5:
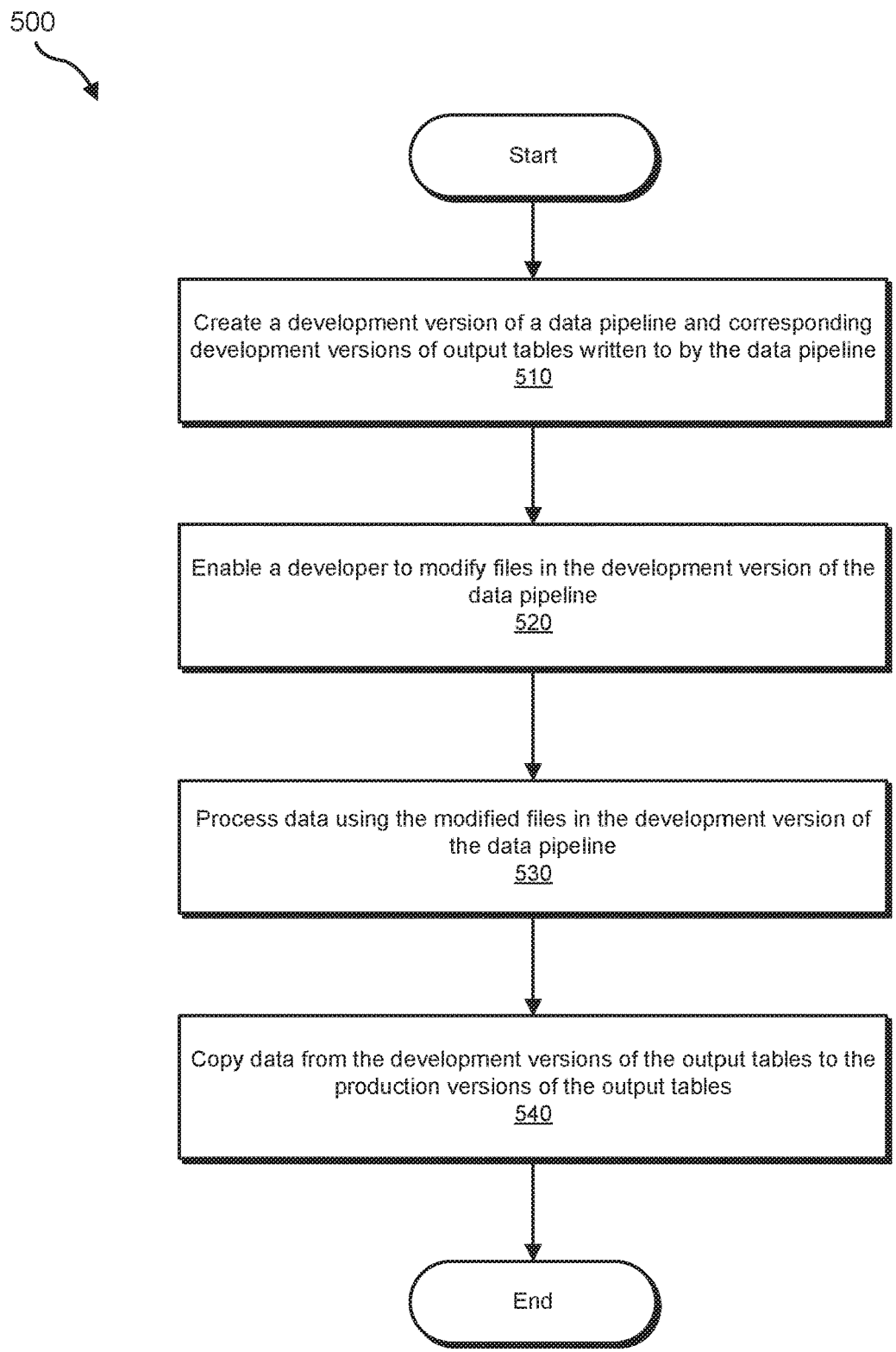
FIG. 5 is a flow diagram of an exemplary method for updating data pipelines.

In some embodiments, the systems described herein may enable developers to avoid lengthy transition periods in production environments by enabling developers to copy data from development versions of output tables to production versions of output tables. FIG. 5 is a flow diagram of an example computer-implemented method 500 for updating data pipelines and the corresponding output tables. At step 510, the systems described herein may create a development version of a data pipeline and corresponding development versions of output files written to by the data pipeline. At step 520, the systems described herein may enable a developer to modify files in the development version of the data pipeline. For example, a developer may change data processing logic, specify different data to be read and/or produced, and/or make any other type of change. At step 530, the systems described herein may process data using the modified files in the development version of the data pipeline and may write the data to development versions of the output tables. In some examples, the systems described herein may then modify the files in the production version of the data pipeline by copying selected content from the development version of the data pipeline and/or may entirely replace production versions of the files with the development versions of the files. In one embodiment, the systems described herein may maintain a configuration of which version of the files is the production version and may update the configuration to specify that the version previously designated as the development version of the files is now the production version. Rather than waiting for the modified production data pipeline to produce new data, at step 540, the systems described herein may copy data from the development version of the output tables to the production version of the output tables.

Processing data in a development version of the pipeline and then copying the data to production versions of the output tables in this way may enable the systems described herein to convert an entire data pipeline system from an old version to a new version via an atomic switch operation, rather than waiting for the production versions of output tables to slowly fill up with new data. In some cases, this may avoid minutes, hours, or even days of transition time where output tables contain some old data and some new data while the modified data pipeline processes data using the new logic and writes the processed data to output tables.

In some embodiments, the systems described herein may create development versions of a data pipeline and/or development versions of tables relevant to the data pipeline at regular intervals. For example, the systems described herein may automatically create a development version of the data pipeline and/or tables once per week. In other embodiments, the systems described herein may only create a development version of a data pipeline and/or tables when triggered to by a developer. In some examples, the systems described herein may maintain two copies of a data pipeline that includes one production version of the data pipeline and one development version of the data pipeline. In other examples, the systems described herein may create numerous development versions of a data pipeline.

As described in connection with method 100 above, the systems and methods described herein may enable developers to efficiently and easily create development branches of data pipelines in order to update data pipelines with less risk of bugs and less disruption to production data. In some embodiments, instead of relying on a single instance or version of data pipelines, the systems and methods described herein may create alternate development) versions of production pipelines that automatically (i) write to versioned tables and (ii) read from either production or versioned tables, as needed. With the exception of blacklisted inputs (which identify required production input tables), the systems and methods described herein may automatically deduce the correct input/output table for each operation based on a regular expression defined in a versioning scheme that appends version suffixes to pipeline paths. The systems and methods described herein may apply changes to new development pipelines independent of the production pipelines, allowing developers to test new data-processing logic, reprocess old/current data using new logic, and/or perform other tasks without introducing bugs or confusing trend breaks into the production pipelines. In some examples, new versions of data pipelines may be triggered by data and/or logic changes and/or at predetermined intervals. In some embodiments, when ready for deployment (e.g., upon reprocessing data and completing validation), the systems and methods described herein may convert development pipelines to production pipelines via atomic switch operations.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

The term "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to a new table, use the result of the transformation to make the data accessible in the new table, and store the result of the transformation to a database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   identifying at least one file that defines a series of transformations for data that passes through a production version of a data pipeline for an application, wherein the data pipeline reads input data from a plurality of input tables and writes output data to at least one output table;
   designating at least one additional file as a development version of the data pipeline, wherein the at least one additional file comprises a modified version of the at least one file and defines a modified series of transformations for the data;
   creating an additional version of the output table;
   detecting an execution of the additional file that is designated as the development version of the data pipeline; and
   in response to both detecting the execution of the additional file and determining that the additional file is designated as the development version of the data pipeline:
      directing the execution of the additional file to process at least one input table in the plurality of input tables and process an additional version of each remaining input table in the plurality of input tables such that the production version of the data pipeline and the development version of the data pipeline both use the at least one input table as a common input; and
      directing output data written by the additional file to the additional version of the output table instead of the output table, thereby enabling a developer to test changes to the data pipeline via the development version of the data pipeline instead of the production version of the data pipeline.

2. The computer-implemented method of claim 1, wherein:
   designating the additional file as a development version of the data pipeline comprises detecting the additional file in a directory designated as a development directory; and determining that the additional file is designated as the development version of the data pipeline comprises determining that the additional file is stored in the development directory.

3. The computer-implemented method of claim 2, wherein determining that the additional file is stored in the development directory comprises parsing a name of the development directory with a regular expression.

4. The computer-implemented method of claim 1, further comprising:
creating an additional version of at least one input table in the plurality of input tables at least in part by copying data from the at least one input table; and
directing the additional file to read input data from the additional version of the at least one input table instead of the input table in response to both detecting the execution of the additional file and determining that the additional file is designated as the development version of the data pipeline.

5. The computer-implemented method of claim 4, further comprising:
determining that the additional version of the at least one input table is no longer up to date; and
updating the additional version of the at least one input table by copying up-to-date data from the at least one input table.

6. The computer-implemented method of claim 1, wherein:
the output table is accessible to end users of the application; and
the additional version of the output table is not accessible to end users of the application.

7. The computer-implemented method of claim 1:
further comprising creating a list of tables not to copy; and
wherein creating the additional versions of the remaining input tables comprises:
identifying a set of tables relevant to the application; and
for each table within the set of tables that is not in the list of tables not to copy, creating an additional version of the table.

8. The computer-implemented method of claim 1, further comprising replacing data within the output table with the output data written by the development version of the data pipeline to the additional version of the output table.

9. The computer-implemented method of claim 1, further comprising modifying the file by copying content from the additional file to the file.

10. The computer-implemented method of claim 1, further comprising creating, at regular intervals, at least one new file that comprises a new modified version of the file and that is designated as the development version of the data pipeline.

11. A system comprising:
an identification module, stored in memory, that identifies at least one file that defines a series of transformations for data that passes through a production version of a data pipeline for an application, wherein the data pipeline reads input data from a plurality of input tables and writes output data to at least one output table;
a designation module, stored in memory, that designates at least one additional file as a development version of the data pipeline, wherein the at least one additional file comprises a modified version of the at least one file and defines a modified series of transformations for the data;
a creation module, stored in memory, that creates an additional version of the output table;
a detection module, stored in memory, that detects an execution of the additional file that is designated as the development version of the data pipeline;
a direction module, stored in memory, that, in response to both detecting the execution of the additional file and determining that the additional file is designated as the development version of the data pipeline:
directs the execution of the additional file to process at least one input table in the plurality of input tables and process an additional version of each remaining input table in the plurality of input tables such that the production version of the data pipeline and the development version of the data pipeline both use the at least one input table as a common input; and
directs output data written by the additional file to the additional version of the output table instead of the output table, thereby enabling a developer to test changes to the data pipeline via the development version of the data pipeline instead of the production version of the data pipeline; and
at least one physical processor configured to execute the identification module, the designation module, the creation module, the detection module, and the direction module.

12. The system of claim 11, wherein:
the designation module designates the additional file as a development version of the data pipeline by detecting the additional file in a directory designated as a development directory; and
the detection module determines that the additional file is designated as the development version of the data pipeline by determining that the additional file is stored in the development directory.

13. The system of claim 12, wherein the detection module determines that the additional file is stored in the development directory by parsing a name of the development directory with a regular expression.

14. The system of claim 11, wherein:
the creation module creates an additional version of the at least one input table in the plurality of input tables at least in part by copying data from the at least one input table; and
the direction module directs the additional file to read input data from the additional version of the input table instead of the input table in response to both detecting the execution of the additional file and determining that the additional file is designated as the development version of the data pipeline.

15. The system of claim 14, wherein the creation module:
determines that the additional version of the at least one input table is no longer up to date; and
updates the additional version of the at least one input table by copying up-to-date data from the at least one input table.

16. The system of claim 11, wherein:
the output table is accessible to end users of the application; and
the additional version of the output table is not accessible to end users of the application.

17. The system of claim 11, wherein:
the creation module creates a list of tables not to copy;
the creation module creates the additional versions of the remaining input tables by:
identifying a set of tables relevant to the application; and for each table within the set of tables that is not in the list of tables not to copy, creating an additional version of the table.

18. The system of claim 11, wherein the creation module replaces data within the output table with the output data written by the development version of the data pipeline to the additional version of the output table.

19. The system of claim 11, wherein the creation module modifies the file by copying content from the additional file to the file.

20. A non-transitory computer-readable medium comprising one or more computer-readable instructions that, when executed by at least one processor of a computing device, cause the computing device to:
   identify at least one file that defines a series of transformations for data that passes through a production version of a data pipeline for an application, wherein the data pipeline reads input data from a plurality of input tables and writes output data to at least one output table;
   designate at least one additional file as a development version of the data pipeline, wherein the at least one additional file comprises a modified version of the at least one file and defines a modified series of transformations for the data;
   create an additional version of the output table;
   detect an execution of the additional file that is designated as the development version of the data pipeline; and
   in response to both detecting the execution of the additional file and determining that the additional file is designated as the development version of the data pipeline:
      direct the execution of the additional file to process at least one input table in the plurality of input tables and process an additional version of each remaining input table in the plurality of input tables such that the production version of the data pipeline and the development version of the data pipeline both use the at least one input table as a common input; and
      direct output data written by the additional file to the additional version of the output table instead of the output table, thereby enabling a developer to test changes to the data pipeline via the development version of the data pipeline instead of the production version of the data pipeline.

* * * * *